United States Patent
Blount

(10) Patent No.: US 6,777,469 B2
(45) Date of Patent: Aug. 17, 2004

(54) UREA CONDENSATE-SEWER SLUDGE PRODUCTS

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 386 days.

(21) Appl. No.: 09/973,553

(22) Filed: Oct. 9, 2001

(65) Prior Publication Data

US 2003/0022959 A1 Jan. 30, 2003

Related U.S. Application Data

(63) Continuation-in-part of application No. 09/693,194, filed on Oct. 23, 2000, now Pat. No. 6,464,903, and a continuation-in-part of application No. 08/723,779, filed on Sep. 30, 1996, now Pat. No. 5,854,309.

(51) Int. Cl.$^7$ .......................... C08K 5/21; C08G 18/08; C05F 5/00
(52) U.S. Cl. ..................... 524/198; 524/211; 528/52; 71/12; 71/13
(58) Field of Search ................. 524/198, 211; 528/52; 71/12, 13

(56) References Cited

U.S. PATENT DOCUMENTS

| | | | | |
|---|---|---|---|---|
| 3,713,800 A | * | 1/1973 | Karnemaat | 71/14 |
| 4,519,831 A | * | 5/1985 | Moore | 71/13 |
| 5,022,917 A | * | 6/1991 | Allan | 504/348 |
| 5,854,309 A | * | 12/1998 | Blount | 523/179 |

* cited by examiner

Primary Examiner—Tae H. Yoon

(57) ABSTRACT

Aqueous or solid nitrogen containing compound compounds are produced by heating urea with wet solid sewer sludge thereby producing a urea-urea condensate-sewer sludge composition in a process to dry out the sewer sludge. The urea reacts with itself and with the compounds in the sewer sludge. The urea and/or urea condensate reacts with the sulfur containing compounds thereby reducing the odor from heating the sewer sludge. The urea-urea condensate-sewer sludge composition is useful as a bio-fertilizer, may be utilized to fight grass, forest, building fires, flame retard other flammable organic material by applying it on or incorporating it in these flammable organic materials and may be reacted with aldehydes to produce resins. Carbonization auxiliaries, such as phosphorus containing compounds, metal containing compounds that will accelerate carbonization, heat reflector, surfactant and fillers may be added to or reacted with the aqueous or solid urea-urea condensate-sewer sludge composition.

7 Claims, No Drawings

UREA CONDENSATE-SEWER SLUDGE PRODUCTS

This application is a continuation-in-part of Ser. No. 08/723,779 filed Sep. 30, 1996 now U.S. Pat. No. 5,854,309, and is a continuation-in-part of Ser. No. 09/693,194 filed Oct. 23, 2000, now U.S. Pat. No. 6,464,903.

FIELD

This invention concerns urea and urea condensate reacted with sewer sludge for use as fertilizer, to produce resins, as odor controlling and as fire retardant agent. The invention also concerns the preparation and use of nitrogen containing compound produced by reacting urea or urea condensates with the compounds in sewer sludge. The nitrogen containing compounds produced by reacting urea or urea condensates with sewer sludge and/or its composition is useful in the reduction of odor in the process of dehydrating sewer sludge for use as a fertilizer, also useful in production of resins such as formaldehyde-urea condensate-sewer sludge resins, as a flame retardant to stop house fires, grass and forest fires, to produce flame retarded water based plastic, flame retarded plastics, flame retardant polyurethane foam, etc, and fire retardant flammable organic materials by incorporating in or by spraying on the outside of materials.

BACKGROUND

Urea in the form of a solid compound has been used as a flame retardant agent in polyurethane foams as outline in U.S. Pat. No. 4,385,131 (Fracalossi, et al.). Many patents use solid urea condensates, urea phosphates, urea borates and urea derivative as the flame retardant agent. Dried sewer sludge is used as a fertilizer but has a very low nitrogen content. The reaction of urea with sewer sludge, the use of urea to react with the sulfur containing compounds in sewer sludge and the use of aqueous or powdered nitrogen containing compound of urea condensates to reacted with sewer sludge as odor suppressant, as fertilizer with a high nitrogen content, for adjusting the pH of the sewer sludge and as the fire retardant compound are novel. When solid urea is used in sufficient amounts, as the flame retardant compound in the production of flame retardant organic products, such as polyurethane products it leaves a slummy or soapy feel to the outer surface of the urethane products, which is very undesirable. The urea migrates out and the product becomes less fire retardant. When the powdered or aqueous nitrogen containing compound urea and urea condensate reacted with sewer sludge are utilized, it reacts with the polyisocyanate and becomes a part of the product. There is no slimy or soapy feel to this foam Aqueous or solid urea condensate reaction products of sewer sludge when used as a fertilizer is very environmentally safe product, also safe to use to put out grass and forest fire and to flame retard organic materials. The aqueous or solid urea condensate reaction products of sewer sludge has both a rapid acting and a long acting nitrogen component. The ammonium salts and urea are rapid acting and the urea condensate and it's salts are long acting fertilizer with a slow release of nitrogen. When used for fire fighting the aqueous urea condensate reaction produced with sewer sludge may contain coloring agents such as iron oxide, thickening agents, gelling agents, corrosive inhibitors, bactericide agents, surfactant and wetting agents. The urea reacted with sewer sludge increases the nitrogen content in the sewer sludge fertilizer. The sewer sludge reacted with urea will react with aldehydes to produce aldehyde-urea-urea condensate sewer sludge resins.

What is lacking and what is needed are useful, safe and inexpensive products produced by reacting urea with sewer sludge. What is additionally lacking are compositions having aqueous or powdered nitrogen containing compound, such as urea or urea condensate reacted with sewer sludge, employed therein. What is additionally lacking is a method to reduce the odor from heating wet sewer sludge. What is additionally lacking is a method to produce resins utilizing sewer sludge.

SUMMARY

The wet sewer sludge cake contains many compounds both organic and inorganic. The urea and/or urea condensate will react with many of the compounds that are found in the sewer sludge such as sulfur oxyacids, urea, amino compounds, carbohydrates, hemicellulose, fatty acids, glycerine, amides, etc. Much of the sewer sludge is non-reacted fillers.

In one aspect, the invention comprises the aqueous or powdered nitrogen containing compound, urea-urea condensate-sewer sludge compositions products produced by reacting urea or urea condensates with sewer sludge. Another aspect of the invention is a process to prepare the aqueous or solid nitrogen containing compounds produced by reacting urea or urea condensate with sewer sludge and/or a composition.

Another aspect of this invention is the process to prepare an aqueous or solid nitrogen containing compounds, urea-urea condensate-sewer sludge compositions produced by reacting urea and/or urea condensate with sewer sludge and/or a composition by reacting and/or mixing:

(A) urea and/or urea condensate, in the amount of 10 to 200 parts by weight;
(B) sewer sludge, in the amount of 100 to 200 parts by dry weight;
(C) carbonization auxiliaries, in the amount of 0 to 300 parts by weight;
(D) metal containing compound that will accelerate the carbonization process, in the amount of 0 to 30 parts by weight;
(E) filler, in the amount of 0 to 300 parts by weight;
(F) water, in the amount of 0 to 500 parts by weight.

Another aspect of this invention is to apply the flame retardant compound of this invention in or on a more flammable organic material (Component H). The flame retardant compounds, aqueous or sold nitrogen containing compound, urea and urea condensate reacted with sewer sludge and/or it's composition, may be used.

Another aspect of this invention is to utilize the aqueous nitrogen containing compounds, urea and urea condensate reacted with sewer sludge and/or the aqueous nitrogen containing compounds, urea and urea condensate reaction products with sewer sludge composition to fight fires such as grass fires, forest fires, house fires, furniture fires, etc. In fighting grass fires a solution of aqueous urea-urea condensate-sewer sludge and/or aqueous nitrogen containing compound of urea, urea condensate reacted with sewer sludge composition, with or without, surfactant, to produce bubbles, may be sprayed directly on the flames or may be sprayed in front of the flames thereby wetting the organic materials in front of the fire. The aqueous urea and urea condensate reacted with sewer sludge and/or it's composition, even after drying, and for several day afterwards, will prevent the coated organic materials such as grass, leaves and bushes from catching on fire when exposed to flames.

Another aspect of this invention is to utilized urea or urea condensate to react with the sulfur compounds in the sewer sludge to reduced the odor produced by heating the sewer sludge. The urea and urea condensate also reacts with other compounds in the sewer sludge to produce fertilizer with an increase in the nitrogen content of the bio-fertilizer. The non-reacted urea may be used as a fertilizer.

Another aspect of this invention is to utilized the urea-urea condensate-sewer sludge composition to produce resins. This composition will react with aldehydes, polycarboxyl acids and/or anhydrides and polyepoxy compounds to produce resins.

COMPONENT A

Urea in any suitable form such as granules, beads, powder or an aqueous solution may be used in this invention. The urea may be first heated to form a urea condensate then used in this invention. The urea and/or urea condensate is used in the amount of 10 to 100parts by weight.

COMPONENT B

Any suitable sewer sludge may be used in this invention. It is preferred that the sewer sludge be in the form of a wet compressed solid mass. The sewer outflow is treated with coagulating compounds and the solids are coagulated, then the excess water is filtered off. The remaining solids are compressed into a wet solid mass known as a cake. The compressed sewer sludge contains many different compounds such as cellulose, carbohydrates, nitrogen containing compounds such as urea, proteins, amides, amino compounds and others, minerals, organic and inorganic salts, sulfur compounds and other compounds. The sewer sludge, based on it's dry weight, is used in the amount of 100 to 200 parts by weight, based on the weight of the urea.

COMPONENT C

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, silicon-phosphorus compounds, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives, sulfuric acids, their salts and their derivatives such as ammonium sulfate, urea sulfate, etc., may also be used for this purpose. The commonly known fertilizer which contains phosphorus or sulfur are inexpensive carbonization auxiliaries that can be used with the aqueous urea-urea condensate-sewer sludge, especially in fire fighting and fire prevention and are preferred. The carbonization auxiliaries and other flame retardant agents may be used in quantities of 0 to 300 parts by weight. The carbonization auxiliaries and other flame retardant agents are not a necessary component but when used is used in an amount of 5 to 200 part by weight. The ammonium phosphates may also act as a corrosive inhibitor.

The nitrogen containing salts of phosphorus acids are the preferred carbonization compounds, such as amino phosphate, amine and polyamine phosphates, amino salts of organic phosphorus compounds and amino condensation salt of inorganic and organic phosphorus compounds. The condensation salt of phosphorus compounds are produced by contacting urea condensates such as, biuret, cyanuric acid and cyamelide or other amino compounds with a phosphorus containing compound that will react with an amino compound, under conditions sufficient to prepare an amino salts of a phosphorus containing compound. Suitable inorganic phosphorus compounds include, but not limited to, phosphoric acid, pyrophosphoric acid, triphosphoric acid, metaphosphoric acid, phosphorous acid, hydrophosphorous acid, phosphinic acid, phosphinous acid, phosphine oxide, phosphorus trihalides, phosphorus oxyhalides, phosphorus oxide, and their salts, amino phosphates, amine phosphates, mono-metal hydrogen phosphates, ammonium dihydrogen phosphate, ammonium phosphate, bromated phosphates, alkali metal dihydrogen phosphate, and halogenated phosphate-phosphite and their halides and acids. organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic diphosphonate esters, aryl phosphites, aryl hydrogen phosphates, halogenated phosphonates esters, biuret phosphate, cyanuric phosphate, cyamelide phosphate, and urea, biuret, cyanuric acid and cyamelide borates and mixtures thereof.

COMPONENT D

Any suitable metal-containing compound that will accelerate carbonization effect used in this invention increases the amount of carbonization residue after combustion, thereby enhancing the flame retardant effect and may be used in this invention. These compounds include, but not limited to, alkaline earth metal borates such as magnesium borate, calcium magnesium borate and the like, manganese borate, zinc borate, metal oxides of titanium oxide, tin oxide, nickel oxide, zinc oxide and the like, ferrocene, dimethylglyoxime copper, acetyl-acetonatocooper, hydroxyquinoline nickel and the like, zinc thiocarbamate compounds such as zinc dimethylthio-carbamate , zinc di-n-butyldithiocarbamate and the like, mercaptobenzothiazole zinc compounds such as mercaptobenzothiazole zinc and the like, salicyadehyde zinc compounds such as salicylaldehyde zinc and the like, metal hydroxides such as aluminum hydroxide, magnesium hydroxide, calcium magnesium hydroxide, zirconium hydroxide and the like and mixtures thereof. The most preferable compounds are selected from zinc oxide, zinc thiocarbamates, the mercaptobenzothiazole zinc compounds the salicyaldehyde zinc compounds, zinc borate and the alkaline earth metal borates. The are utilized in the amount of 0 to 30 parts by weight. These metal containing carbonization accelerators are not necessary components but when used it is used in the amount of 1 to 30 parts by weight.

COMPONENT E

Any suitable filler may be used in this invention. The fillers that may be utilized in the fertilizer and/or flame retardant mixture may be insoluble in the reaction mixtures. They may be inorganic substances, such as, alkali metal compounds, alkaline earth metal compounds, alkali metal silicates, alkaline earth metal silicates, oxides or hydroxides, metal silicates, silica, metals oxides, carbonates, sulfates, phosphates or borates, glass beads or hollow glass beads. Hydrated aluminum oxide is preferred in the flame retardant composition. Lime is preferred in the bio-fertilizer. They may be organic substances, such as, amino compounds, such as urea, melamine, dicyandiamide, urea condensates, urea-amino condensates, partially hydrolyzed urea condensates and other amino derivatives or their formaldehyde resins, amino phosphates, amino salts of organic phosphates, phenol-aldehyde resin powder, ammonium sulfates, urea sulfates, biuret sulfate, nitrogen containing sulfates, powdered coke, graphite, graphite compounds, Portland cement, lignin, lignin sulfate, lignin sulfite and mixtures thereof. The organic halide flame retardant compounds may also be added as fillers. The filler may be used in the amount of 0 to 300 parts by weight. Fillers are not a necessary component, but useful, and if used is used in the amount of 5 to 300 parts by weight.

COMPONENT F

Any suitable surfactant that will assist in the production of bubbles or used as a wetting agent may be used in this invention, such as soaps, detergents and silicon surfactants, such as water-soluble polyester siloxanes,. Any surface active agent that will assist in the formation of foam or as a wetting agent such as cationic, anionic, non-ionic and amphoteric surfactants may be used in this invention. The surfactant may be used in the amount of 0 to 30 parts by weight. The surfactant is not a necessary component except when bubbles and wetting agents are desired, then it is used in the amount of 1 to 30 parts by weight.

Component G

Water may be added to the reactants or may be added to the nitrogen containing compound, urea-urea condensate-sewer sludge or its composition to produce aqueous solutions. Water may be added in any suitable amount but usually in the amount of 0 to 500 parts by weight based on the weight of the urea.

Component H

Any suitable organic material which is more flammable than the aqueous or solid nitrogen containing compound urea and/or it's composition may be used in this invention. Any suitable plastic resin composition or mixtures thereof and any suitable natural organic material maybe used in this invention and mixtures thereof. These materials may be in the form of a solid, cellular suspension, emulsion or solution but the plastic are preferable to be in the form of or a suspension, emulsion, solution or as a liquid monomer. Suitable plastic resin include, but not limited to, vinyl dienes, vinyl-diene copolymers, polyesters, polyester resins, phenoplasts, aminoplasts, polyepoxy resins, polyurethanes, furans, polyamides, polyimides, polycarbonates, homopolymers of such olefins as ethylene, propylene, and butylene; block copolymers, consisting of optional combination of these olefins; polymers of vinyl compounds such as vinyl chloride, acrylonitrile, methyl acrylates, vinyl acetates and styrene; copolymers of the foregoing olefins with vinyl monomers, copolymers and terpolymers of the foregoing olefins, with diene compounds; polyesters such as polyethylene terephthalate, polyester resins; polyamides such as nylon; polycarbonates, polyoxymethylene, silicones, polyethers, thioplasts, polytetrafluoroethylene, polysulfones, vinyldienes, poly(vinyl acet compounds, cyclic unsaturated compounds, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include but not limited to grass, weeds, leaves, wood, cellulose, lignin-cellulose, paper, cotton, wool, linen, dammars, copols, other natural resins, rosins, lignin, lignin sulfate, lignin sulfite, natural rubber, natural proteins, e.g., soya bean protein, silk, glues, gelatin, etc.; modified cellulose and mixtures thereof. Natural organic material and plastics may be mixed together. The nitrogen containing compound urea condensate salt of sulfur oxyacid and/or the nitrogen containing compound urea condensate salt of sulfur oxyacid composition, maybe utilized in the amount of 3–200 percent, percentage based on the weight of the more flammable organic material.

Any suitable polyisocyanate may be used in this invention organic polyisocyanates are preferred. The commercial available ones are preferred such as tolylene-2,4-diisocyanate, tolylene-2,6-diisocyanate, polymethylene polyphenyl isocyanate, diphenylmethane 4,4'-diisocyanate, 3-methyldiphenyl-methane-4,4'-diisocyanate, m- and p-phenylenediisocyanante, polyphenylpolymethylene isocyaxiates obtained by phosgenation, commercially known as "crude MDI", modified polyisacyanates and mixtures thereof. Suitable organic polyisocyanates are exemplified by the organic diisocyanate which are compounds of the general formula

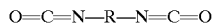

wherein R is a divalent organic radical such as an alkylene, aralkylene or arylene radical. Such radical may contain 2 to 20 carbon atoms. Any suitable compound with active hydrogens may be reacted with the polyisocyanates to produce polyurethane products. The preferred compound with active hydrogens are polyols. Polyurethane catalyst, blowing agents, surfactants, foam stabilizers, dyestuff, plasticizers, propellant, desiccant and fillers may also be used. Polyisocyanate which has the formula

in which m represent a number from 2 to 4 and Q represents an aliphatic hydrocarbon radical having 2 to 18 C atoms, a cycloaliphatic hydrocarbon radical having 4 to 15 C atoms, an aromatic hydrocarbon radical having 6 to 15 C atoms, or araliphatic hydrocarbon radical having 8 to 15 C atoms, in the amount of 25 to 100 parts by weight, and an organic compounds with 1 or more active hydrogens which will react with an isocyanate, in the amount of 25 to 100 parts by weight, containing a urethane catalyst, in the amount of 0.25 to 10 parts by weight, a plasticizer, propellants and a silicone surfactant, in the amount of 0.5 to 5 parts by weight, may be used as the flammable organic material. Any suitable polyepoxy compounds may be used in this invention such as ally glycidyl ether, tert-butyl glycidyl, and the like.

ILLUSTRATIVE EMBODIMENTS

In general, the urea and/or aqueous urea are usually produced by reacting ammonia and carbon dioxide in an aqueous medium while under heat and pressure. This aqueous urea may be utilized in this invention or the urea can be crystalized by removing some of the water. The solid urea may then be added to water to form an aqueous solution of urea which usually contains less than 50% urea. The concentrated aqueous urea may be heated to about its boiling point to produce urea condensates which are soluble in water or the urea heated to or above the melting point to produce a urea condensate such as biuret, cyanuric acid and cyamelide or a partially hydrolyzed urea condensate. Ammonia is produced by heating urea to produce the urea condensate.

Any suitable amount of the aqueous or solid nitrogen containing compound, urea and urea condensate reacted with sewer sludge and/or it's composition, which may include carbonization auxiliaries, metal containing compounds that accelerated carbonization, heat reflecting substances, surfactant and fillers may be used and added to sewer sludge, biofertilizer and/or flame retardant materials. Preferably, when the nitrogen containing compounds, urea and urea condensate reacted with sewer sludge and/or it's composition is incorporated in the more flammable organic material an amount of 3 to 200% by weight, percentage based on the weight of the more flammable organic material, is utilized. When the aqueous nitrogen containing compounds, urea and urea condensate reacted with sewer sludge and/or it's composition is applied on the more flammable organic material, in a sufficient amount, will produce a less flammable organic material. Usually an amount that will wet the surface of the flammable organic material is sufficient.

The aqueous or solid nitrogen containing compounds, urea and urea condensate reacted with sewer sludge and/or it's composition is usually added on or incorporated in the flammable organic material or a fertilizer at ambient temperature and pressure but elevated temperatures and pressure may be utilized when necessary.

The nitrogen containing compound urea condensate salt of sulfur oxyacid may be produced by heating urea with the sulfur containing compounds in the sewer sludge and reduces the amount of sulfur oxides which is released into the air. When urea is heated it reacts with itself to produce condensates such as biuret, cyanuric acid and cyamelide. Ammonia is produced in the condensate reaction. The ammonium urea condensate salt of sulfur oxyacid may also be produced by reacting aqueous ammonium, urea and sulfur oxyacid found in the sewer sludge or by first reacting the ammonia with sulfur oxyacid to produce ammonium sulfur oxyacid then reacting it with urea or urea condensate or partially hydrolyzed urea condensate. These chemical reactions may take place at ambient or elevated temperature sufficient to melt the urea ranging from ambient to 180° C.

One method to measure this flame retardant capability is an oxygen index test. By selecting the various combinations of the mixture of nitrogen containing compound urea or it's compositions, which is then incorporate into a more flammable organic material, so that the average limiting oxygen index (LOI) can be raised 10 to 30 percent or more when compared to otherwise comparable samples without the flame retardant nitrogen containing compound urea composition. For example the LOI of three flexible polyurethane foams with the aqueous or solid nitrogen containing compounds, urea and urea condensate reacted with sewer sludge and/or it's composition, were raised more than 30 percent to a LOI of 31.7, 30.3 and 30.7.

When the aqueous or solid nitrogen containing compound, urea and urea condensate reacted with sewer sludge and/or it's composition was incorporated into rigid polyurethane foam and tested, with a propane torch with a 2" flame held against the foam for one minute, the flame did not spread, the foam melted and/or a char was formed. The flame went out when the torch was removed. Various aqueous or solid nitrogen containing compounds, urea and urea condensate reacted with sewer sludge and/or it's compositions were incorporated into liquid resins then cured into a solid in the form of a ⅛"×2"×6" sample, for example, flexible polyepoxy resins, rigid polyepoxy resins, polyester laminating and flexible resin, polystyrene resin, polymethyl methyl acrylate resin, polyvinyl acetate resin, polyurethane, polyisoprene, polyethylene, acrylonitrile, etc, then tested with a propane torch having a 2" flame, and held against the sample for 30 seconds. The flame did not spread, and went out when the flame was removed. Various mixture of aqueous nitrogen containing compounds, urea and urea condensate reacted with sewer sludge and/or it's aqueous compositions was add to aqueous emulsions and organic solutions of the above plastics, then dried to form a test sample, then tested as above with good results.

The flexible flame retardant polyurethane foams were tested and passed the Calif. TB 133 test which utilizes a 100 gms of wood in the form of a crib being burned on top of the flexible foam. If more than 60 gms of the foam burns away it fails this test.

Various natural products such as wood shingles, paper, cotton cloth, and cardboard were coated with various aqueous solutions containing 30% nitrogen containing compounds, urea and urea condensate reacted with sewer sludge and/or it's compositions with or without adhesives. Then after the product had dried, they were tested by applying a 2" flame from a propane torch against the products, and the flame did not spread whereas the non coated products caught on fire and burned.

The urea-urea condensate-sewer sludge composition will react with aldehydes to produce resins. Any suitable aldehyde may be used such as, but not limited to, formaldehyde, paraformaldehyde, acetoaldehyde, butyraldehyde, chloral, and other alkyl aldehydes, furfural, benzyl aldehyde, aromatic aldehydes and mixtures thereof. Aqueous formaldehyde is the preferred aldehyde. The aldehyde may be used in the amount of 25 to 200 parts by weight based on 50 to 100 parts by weight of the dry urea-urea condensate-sewer sludge composition. Any suitable basic or acid compound may be used as the catalyst in the reaction of the aldehyde with the urea-urea condensate-sewer sludge composition. A catalytic amount is utilized.

DESCRIPTION OF PREFERRED EXAMPLES

The present invention will now be explained herein-after by way of a few examples and comparative examples, these examples setting, however, no limits to this invention. Parts and percentage are by weight, unless otherwise indicated.

Example 1

The solids in sewer material is coagulated by the use of a coagulating chemical then filter and compressed to remove the excess water to form a wet filter cake. 20 parts by weight of urea is mixed with 100 parts by weight (based on dry weight of the sewer sludge) of the wet filter cake then heated to 100° to 130° C. for 20–30 minute or until the mixture was dry. Any suitable temperature may be used depending on the method used to dry the sewer sludge. The odor produced when heating the sewer sludge cake is reduced by the reaction of urea reacting with the sulfur containing compounds. The urea-urea condensate-sewer sludge is then ground into granules or powder and used as a fertilizer. The powder may be dissolved in water to for an aqueous solution. The undissolved portion is filtered off and used as fertilizer. The aqueous solution is a fire retardant when sprayed on a fire. The aqueous solution may be sprayed on dry brush and then dried. The treated brush will stop the progress of a fire.

Example 2

An area 3'×6' with dry grass, weeds and leaves of an average of 1' tall was sprayed in the middle 2'×3' area with an aqueous solution containing 25% water soluble urea-urea condensate-sewer sludge produced in example 1, until the grass and weeds were wet. One side of the dry untreated material was set on fire and the fire traveled to the center treated area and stopped. The other untreated area did not catch on fire.

Example 3

Example 2 is modified to wherein the wetted area was dried, and the other untreated side was set on fire. The fire traveled to the treated middle section then went out.

Example 4

Example 3 is modified wherein the middle section was dried for 4 days then a 3' square pile of dry grass, weeds and leaves were placed next to the treated section on both sides then one side was set on fire. The fire burned to the treated section then some of the lower grass burned but went out before spreading to the other side.

Example 5

A 3'×3'×3' pile of green fir tree branches was sprayed with a 30% aqueous solution of the aqueous solution of urea-urea condensate-sewer sludge until it was wet. A 2'×3'×2' pile of dry grass was place on one side of the treated fir branches. The grass was set on fire and burned. A few needles of the fir branches next to the fire burned but did not spread to the rest of the branches. After the fir branches had dried another 2'×3'×2' pile of dry grass was placed on the opposite side and next to the treated fir branches. The grass burned and some of the fir needles burned but the flames did not spread to the rest of the fir branches.

Example 6

A 1'×1'×0.5" square of an untreated polyurethane foamed mattress was sprayed with the aqueous containing 30% urea-urea condensate produced in example 1, until the mattress foam was wet. The mattress was allowed to dry for 2 days then a burning cigarette was placed on the foam. The cigarette burned out but the foam did not catch on fire.

Example 7

Example 7 is modified wherein strips of cotton, polyester, nylon and acrylic cloth was placed on the treated polyurethane foamed mattress then the strips were set on fire. The cloth strip burned but the foam did not catch on fire.

Example 8

Example 6 is modified wherein a carbonization auxiliary in the amount of 10% by weight, based on the weight of the aqueous solution is added to the aqueous solution and is selected from the list below:

| | |
|---|---|
| a) | pyrophosphoric acid |
| b) | phosphinic acid |
| c) | phosphorus trichloride |
| d) | phosphorus oxytrichloride |
| e) | phosphorus oxide |
| f) | ammonium dihydrogen phosphate |
| g) | mono-aluminum phosphate |
| h) | dimethyl methyl phosphonate (DMMP) |
| i) | dimethyl hydrogen phosphite |
| m) | phosphorus thiochloride |
| j) | phenyl acid phosphate |

| | -continued |
|---|---|
| k) | methylchlorophosphine |
| l) | phosphorus |
| n) | tris(2-chloropropyl) phosphate |
| o) | triphenyl phosphite |
| p) | tris 2-chloroethyl phosphite |
| q) | triethyl phosphite |
| r) | urea dihydrogen phosphate |
| s) | diethyl phosphite |
| t) | trimethyl phosphite |
| u) | dibutyl pyrophosphoric acid |
| v) | O,O-dimethyl hydrogen dithiophosphate |
| w) | melamine hydrogen boron-phosphate |
| x) | hypophosphorous acid |
| y) | methyl amine salt of phosphoric acid |
| z) | ammonium sulfate |

Example 9

10 parts by weight of urea is added too and mixed with the wet sewer sludge cake in the amount of 100 parts by weight, based on the dry weight of sewer sludge, with the excess water pressed out. The mixture is heated to about 110 degree C. for about 30 minutes thereby producing a urea-urea condensate-sewer sludge. The urea reacted with the sulfur containing compounds and reduced the odor produced by heating the sewer sludge. The mixture is then ground into a powder.

Example 10

A 4'×4'×3' pile of dry branches from fir, cedar and oak trees was set on fire, then after the fire was burning good it was sprayed with an aqueous solution containing 20% by weight of the water soluble urea-urea condensate-sewer sludge produced in example 9, and the fire went out quickly.

Example 11

Example 10 is modified wherein an carbonization auxiliary in the amount of 5% by weight, based on the weight of the aqueous solution, is add to the aqueous solution and selected from the list below:

| | |
|---|---|
| a) | dimelamine phosphate |
| b) | dicyandiamide phosphate |
| c) | urea dihydrogen phosphate |
| d) | guanidine phosphate |
| e) | aminoguanidine phosphate |
| f) | diethyltriamine urea phosphate |
| g) | melamine salt of dimethyl methyl phosphonate |
| h) | melamine salt of dimethyl hydrogen phosphite |
| i) | methylamine melamine phosphoric acid |
| j) | methyl carbamate salt of phosphoric acid |
| k) | melamine salt of boron-hydrogen phosphate |
| l) | O-methyl urea |
| m) | urea salt of boron-phosphate |
| n) | urea-formaldehyde phosphate |
| o) | aminophenol phosphate |
| p) | ammonium urea phosphate |
| q) | ammonium melamine phosphate |
| r) | melamine salt of trimethyl phosphite |
| s) | melamine salt of phenyl acid phosphate |
| t) | cyanuric phosphate |

Example 12

About 25 parts by weight of aqueous solution containing 55% urea-urea condensate-sewer sludge of example 1, 20% sucrose, 2% amine urethane catalyst and 0.3% silicone foam regulator surfactant are mixed with 35 parts by weight of MDI thereby producing a rigid, fine cells, polyurethane foam which weighed about 1 lb./cu. ft. After 1 week a ½"×2"×6" vertically placed sample of this foam was tested using a 2" blue Bunsen burner flame placed at the bottom of the sample for 1 minute. The foam under the flame formed a char. The foam did not catch on fire.

Example 13

Example 1 is modified wherein the urea containing 10% water is heat to about 110 degrees C. thereby producing an aqueous urea condensate, then reacted with the sewer sludge.

Example 14

Example 9 is modified wherein 20 parts by weight of a carbonization auxiliary is added to 100 parts by weight of the urea-urea condensate-sewer sludge composition and the carbonization auxiliary is selected from the list below:

| | |
|---|---|
| a) | dimelamine phosphate |
| b) | dicyandiamide phosphate |
| c) | urea dihydrogen phosphate |
| d) | guanidine phosphate |
| e) | aminoguanidine phosphate |
| f) | diethyltriamine urea phosphate |
| g) | melamine salt of dimethyl methyl phosphonate |
| h) | melamine salt of dimethyl hydrogen phosphite |
| i) | methylamine melamine phosphoric acid |
| j) | methyl carbamate salt of phosphoric acid |
| k) | melamine salt of boron-hydrogen phosphate |
| l) | O-methyl urea |
| m) | urea salt of boron-phosphate |
| n) | urea-formaldehyde phosphate |
| o) | aminophenol phosphate |
| p) | ammonium urea phosphate |
| q) | ammonium melamine phosphate |
| r) | melamine salt of trimethyl phosphite |
| s) | melamine salt of phenyl acid phosphate |
| t) | ammonium sulfate |

Example 15

Example 9 is modified wherein 10 parts by weight of a filler selected from the list below is added to the powdered urea-urea condensate-sewer sludge:

| | |
|---|---|
| a) | hydrated aluminum oxide powder |
| b) | hydrated sodium silicate powder |
| c) | melamine |
| d) | dicyandiamide |
| e) | urea sulfate |
| f) | melamine phosphate |
| g) | melamine borate |
| h) | ammonium phosphate |
| i) | ammonium pyrophosphate |
| j) | ammonium carbonate |
| k) | ammonium borate |
| l) | ammonium sulfamate |
| m) | guanidine |
| n) | guanidine carbonate |
| o) | urea phosphate |
| p) | silica powder |
| q) | phenol-formaldehyde resin powder |
| r) | aluminum phosphate |

-continued

| | |
|---|---|
| s) | thiourea |
| t) | hollow beads |
| u) | expandable graphite |
| v) | melamine salt of DMMP |
| r) | ammonium sulfate |
| s) | magnesium chloride |
| t) | antimony trioxide |
| u) | boron-phosphate powder |
| v) | melamine boron-phosphate powder |
| w) | lignin |
| x) | lignin sulfate |

Example 16

Example 9 is modified wherein 10 parts by weight of a phosphorus salt forming compound is added to the aqueous urea-urea condensate-sewer sludge composition and selected from the list below:

| | |
|---|---|
| a) | phosphoric acid |
| b) | pyrophosphoric acid |
| c) | dimethyl methyl phosphonate (DMMP) |
| d) | dimethyl hydrogen phosphite |
| e) | trimethyl phosphite |
| f) | phenyl acid phosphate |
| g) | phosphorus trichloride |
| h) | phosphinic acid |
| i) | phosphorus oxytrichloride |
| j) | ammonium dihydrogen phosphate |
| k) | dimethyl phosphoric acid |
| l) | diethyl ethyl phosphonate |
| m) | magnesium hydrogen phosphate |
| n) | mono aluminum phosphate |

Example 17

Example 16 is modified wherein 5 parts by weight of potassium hydroxide is added to the urea-urea condensate-sewer sludge composition.

Example 18

100 parts by weight of the aqueous nitrogen containing compound, urea-urea condensate-sewer sludge of claim 1 are mixed with 25 parts by weight of a halogenated flame retardant compound and the halogenated flame retardant compound is selected from the list thereby producing a flame retardant composition:

a) brominated epoxy olgmer
b) decabromodiphenyl oxide
c) pentabromodiphenyl oxide
d) 2,3-dibromopropanol
e) octabromodiphenyl oxide
f) tris (dichloropropyl) phosphite
g) tris(dichloropropyl) phosphite Example 19

30 parts by weight of the urea-urea condensate-sewer sludge example 1 are mixed and reacted with 5 parts by weight of dimethyl methyl phosphonate (DMMP), then it was added and mixed with 150 parts by weight of a flexible polyepoxy resins with its polyamine curing agent. The resin is cured then was tested with a 2" propane flame held against the sample for 1 minute. The flame did not spread and the flame went out when the torch was removed. There was about a 2% weight loss.

Example 20

20 parts by weight of powdered urea-urea condensate-sewer sludge produced in example 1, 5 parts by weight of dimethyl hydrogen phosphite and 5 parts by weight of melamine are incorporated into 70 parts by weight of a flexible polyurethane foam produced from MDI and a triol which weighs about 1.75 lbs./cu.ft. The foam was flame tested by using Calif. 133 Test wherein 100 gms of wood is burned on top of the foam. After burning the wood on the foam there was a 50.5 gms weight loss. A weight loss of less than 60 gms is necessary to pass the test. This foam was flame tested using a ½"×2"×6" sample hung vertically, then a 2" propane torch flame was placed at the bottom of the sample for 1 minute. The flame did not spread and the foam melted without burning.

Example 21

30 parts by weight of the powdered urea-urea condensate-sewer sludge, of example 1 and 5 parts by weight of dimethyl methyl phosphonate are incorporated in 100 parts by weight of a rigid polyurethane foam of about 1 lbs./cu.ft., produced using polymeric MDI and aromatic polyester polyol. The rigid polyurethane foam was flame tested using a Bunsen burner that had a 2" flame held against the foam. The flame did not spread and went out when the burner was removed. There was about a 4% weight loss.

Example 22

Example 21 is modified wherein another carbonization agent is added in place of dimethyl methyl phosphonate and selected from the list below:

| | |
|---|---|
| a) | dimelamine phosphate |
| b) | dicyandiamide phosphate |
| c) | urea dihydrogen phosphate |
| d) | guanidine phosphate |
| e) | aminoguanidine phosphate |
| f) | diethyltriamine urea phosphate |
| g) | melamine salt of dimethyl methyl phosphonate |
| h) | melamine salt of dimethyl hydrogen phosphite |
| i) | methylamine melamine phosphoric acid |
| j) | methyl carbamate salt of phosphoric acid |
| k) | melamine salt of boron-hydrogen phosphate |
| l) | O-methyl urea |
| m) | urea salt of boron-phosphate |
| n) | urea-formaldehyde phosphate |
| o) | aminophenol phosphate |
| p) | ammonium urea phosphate |
| q) | ammonium melamine phosphate |
| r) | melamine salt of trimethyl phosphite |
| s) | melamine salt of phenyl acid phosphate |
| t) | ammonium sulfate |
| u) | lignin phosphate |

Example 23

About 25 parts by weight of the powdered urea-urea condensate-sewer sludge produced in Example 9, and 15 parts by weight of dimethyl hydrogen phosphite, 100 parts by weight of triol component (Daloflex XES 11870 by ICI of Europe) and 60 parts by weight of diphenymethane-4,4'-diisocyanate (Suprasec 2424 by ICI) were mixed and foamed into a flexible foam of about 1.5 lbs./cu. ft. After the foam cured for 1 week it was flame tested using Calif. TB 133. The foam sample passed this test with a 44 gms weight loss. Europe's UL94 HF-1, HF-2 flame test were done using a 2 cm flame from a propane torch for 1 minute placed under the ½"×2"×6" sample. This foam passed the test. The sample did not catch on fire and the melted drips did not catch on fire.

Example 24

Example 23 is modified wherein another carbonization auxiliary is used in place of dimethyl hydrogen phosphite and selected from the list below:

| | |
|---|---|
| a) | dimelamine phosphate |
| b) | dicyandiamide phosphate |
| c) | urea dihydrogen phosphate |
| d) | guanidine phosphate |
| e) | aminoguanidine phosphate |
| f) | diethyltriamine urea phosphate |
| g) | urea salt of dimethyl methyl phosphonate |
| h) | melamine salt of dimethyl hydrogen phosphite |
| i) | methylamine melamine phosphoric acid |
| j) | methyl carbamate salt of phosphoric acid |
| k) | melamine salt of boron-hydrogen phosphate |
| l) | Melamine DMMP |
| m) | urea salt of boron-phosphate |
| n) | urea-formaldehyde phosphate |
| o) | aminophenol phosphate |
| p) | ammonium urea phosphate |
| q) | ammonium melamine phosphate |
| r) | melamine salt of trimethyl phosphite |
| s) | melamine salt of phenyl acid phosphate |
| t) | ammonium sulfate |
| u) | urea condensate phosphate |

Example 25

75 parts by weight of aqueous urea-urea condensate-sewer sludge produced in example 9, 200 parts by weight of sucrose amine polyol, hydroxyl No. 350, 30 parts by weight of ammonium urea phosphate, 0.1 part by weight of amine catalyst (Dabco R8020 by Air Products), 0.05 parts by weight of tin catalyst (Dabco T-12 by Air Products) and 220 parts by weight of Diphenymethane-4,4'-diisocyanate are mixed then poured into a mold. A rigid foam of about 1.5 lbs./cu. ft. is formed. After 1 week this foam is flame tested with a 2" propane flame by placing the flame at the bottom of a ½"×2"×6" sample for 1 minute. The flame did not spread and the flame went out when the flame was removed. A char was formed and there was about a 4% weight loss.

Example 26

Example 25 is modified wherein another polyol is used in place of the sucrose amine polyol and selected from the list below:
a) sucrose amine polyol, hydroxyl No. 530 with 25% polypropylene polyol, hydroxyl No. 450;
b) aromatic amino polyol, hydroxyl No. 530 with 25% polypropylene polyol, hydroxyl No. 650;
c) aromatic polyester polyol, hydroxyl No. 350;
d) sucrose polyol, hydroxyl No. 450;
e) phosphorus polyol (VIRCOL 82 by Albright and Wilson).
These samples were tested as above with same good results.

Example 27

Example 25 is modified wherein another polyisocyanate is used and selected from the list below:
a) polymeric MDI (Mondur MR by Miles)
b) polymeric MDI (PAPI 27 by Dow)
c) polymeric MDI (Mondur MRS).

Example 28

100 parts by weight of ethylene modified polypropylene glycol (Multranol 7056 by Miles), 20 parts by weight of the aqueous urea-urea condensate-sewer sludge produced in example 1, 20 parts by weight of melamine phosphate, 1 part by weight of silicone surfactant (L6202 by Union Carbide), 1 part weight of urethane catalyst and 50 parts by weight of TDI (Mondur TD80) are mixed then poured into a mold. A flame retardant flexible foam of about 1.5 lbs./cu.ft.is produced. The foam was cured for 1 week then flame tested with a 2" propane flame placed under a ½"×2"×6" sample (UL94-1,HF-2 TEST). The flame did not spread and the melted drippings did not burn.

Example 29

Example 28 is modified wherein another carbonization agent is added to in place of melamine phosphate and selected from the list below:

| | |
|---|---|
| a) | diaminophosphate |
| b) | dimethyl methyl phosphonate |
| c) | urea phosphate |
| d) | melamine borate |
| e) | ammonium melamine boron phosphate |
| f) | diethyl phosphite |
| g) | ammonium polyphosphate |
| h) | dicyandimide phosphate |
| i) | ammonium phosphate |
| j) | aluminum phosphate |
| k) | tris2-chloroethyl phosphite |
| l) | zinc borate |
| m) | boron oxide |
| n) | boric acid |
| o) | dimethyl phosphite |
| p) | triethy phosphate |
| q) | guanidine phosphate |
| r) | ammonium sulfamate |

These examples were tested as in Example 28 and passed this test.

Example 30

30 parts by weight of the aqueous urea-urea-condensate-sewer sludge produced in Example 1 and 100 parts by weight an aqueous emulsion containing 50% vinyl acetate were mixed then poured into a mold to form a ⅛" thick sample. After the sample was thoroughly dried the sample was flamed tested by using a 2" propane flame held against it for 1 minute. The flame did not spread and went out when the flame was removed.

Example 31

Example 30 is modified wherein 10 parts by weight of a carbonization auxiliary is added to the aqueous urea and selected from the list below:

| | |
|---|---|
| a) | dimelamine phosphate |
| b) | dicyandiamide phosphate |
| c) | urea dihydrogen phosphate |
| d) | guanidine phosphate |
| e) | aminoguanidine phosphate |
| f) | diethyltriamine urea phosphate |
| g) | melamine salt of dimethyl methyl phosphonate |
| h) | melamine salt of dimethyl hydrogen phosphite |
| i) | methylamine melamine phosphoric acid |
| j) | methyl carbamate salt of phosphoric acid |
| k) | melamine salt of boron-hydrogen phosphate |
| l) | urea melamine phosphate |
| m) | urea salt of boron-phosphate |
| n) | urea-formaldehyde phosphate |
| o) | aminophenol phosphate |
| p) | ammonium urea phosphate |
| q) | ammonium melamine phosphate |
| r) | melamine salt of trimethyl phosphite |
| s) | melamine salt of phenyl acid phosphate |
| u) | cyanuric phosphate |

Example 32

Example 30 is modified wherein the vinyl acetate emulsion is replaced with another emulsion containing 50% by weight of a plastic or natural products listed below;
a) vinyl acetate-ethylene copolymer (Airflex RP-226 by Air Products)
b) vinyl acetate-ethylene copolymer (Airflex RP-245 by Air Products)
c) phenol-formaldehyde resin
d) acrylic enamel paint
e) acrylic latex paint
f) methyl methyl acrylate
g) acrylic acid
h) polyurethane
i) polyester resin
j) epoxy resin
k) starch
l) modified starch
m) polyvinyl chloride
n) polyvinyl chloride-vinyl acetate copolymer
o) polystyrene
p) polyamide from vegetable protein
q) nylon
r) rubber latex
s) polybutadiene-styrene copolymer
These samples were tested as in example 39 and gave the same good results.

Example 33

30 parts by weight of aqueous urea-urea condensate-sewer sludge produced in Example 1 and 5 parts by weight of cyclic phosphonate (ANTIBLAZE N from Albright & Wilson), are added to an aqueous emulsion of 100 parts by weight of styrene monomer, then a catalytic amount of potassium persulfate and ferric sulfate is added. The heated mixture is agitated for several hours until the styrene polymerizes. The aqueous emulsion of flame retardant polystyrene is poured into mold and allowed to dry. The dried plastic is then flame tested utilizing a 2" propane flame which is placed under and touch the plastic for three 10 seconds periods. The flame did not spread and did not burn when the flame was removed.

Example 34

Example 33 is modified wherein another plastic monomer is utilized in place of styrene monomer and selected from the list below:
a) acrylic acid monomer
b) methyl acrylic acid monomer with redox system
c) vinyl acetate monomer
d) vinyl chloride monomer with redox system e) vinylidene chloride monomer with redox system
f) methyl acrylate monomer with redox system.
g) acrylonitrile monomer with redox system
h) isoprene monomer
i) chLoroprene monomer
j) butadiene with acrylonitrile
k) butadiene with styrene
l) N-vinyl pyrrolidone monomer with hydrogen peroxide
m) polyvinyl pyridine monomer
n) vinylidene chloride with vinyl chloride These samples were tested as in example 33 with the same good results

Example 35

Example 33 is modified wherein 10 parts by weight of titanium oxide is added to reflect heat.

Example 36

Example 33 is modified wherein 3 parts by weight of a carbonization accelerator is added with the aqueous ammonium urea condensate salt of suiflric acid and selected from the list below:

| | |
|---|---|
| a) | zinc borate |
| b) | zinc oxide |
| c) | calcium magnesium borate |

Example 37

Example 33 is modified wherein 5 parts by weight of a filler is added to the aqueous urea-urea condensate-sewer sludge and selected from the list below:

| | |
|---|---|
| a) | hydrated aluminum oxide powder |
| b) | hydrated sodium silicate powder |
| c) | melamine |
| d) | dicyandiamide |
| e) | urea |
| f) | melamine phosphate |
| g) | melamine borate |
| h) | ammonium phosphate |
| i) | ammonium pyrophosphate |
| j) | ammonium carbonate |
| k) | ammonium borate |
| l) | ammonium sulfamate |
| m) | guanidine |
| n) | guanidine carbonate |
| o) | urea phosphate |
| p) | silica powder |
| q) | phenol-formaldehyde resin powder |
| r) | aluminum phosphate |
| s) | thiourea |
| t) | hollow beads |
| u) | expandable graphite |
| v) | melamine salt of DMMP |
| r) | ammonium sulfate |
| s) | magnesium chloride |
| t) | antimony trioxide |
| u) | boron-phosphate powder |
| w) | melamine boron-phosphate powder |
| x) | ammonium boron-phosphate |
| y) | lignin |

Example 38

Example 1 is modified wherein 5 parts by weight of a nitrogen containing compound is added to the urea and selected from the list below:

| | |
|---|---|
| a) | melamine |
| b) | ethylene diamine |
| c) | ethanolamine |
| d) | guanidine |
| e) | biuret |
| f) | cyanuric acid |
| g) | ethyl amine |
| h) | urea borate |
| i) | ammonium carbonate |
| j) | ammonium sulfamate |
| k) | ammonium sulfate |
| l) | urea phosphate |
| m) | polyamide with free $NH_2$— radicals |
| n) | ethylenetriamine |
| o) | polyisocyanate |
| p) | thiourea |

Example 39

15 parts by weight of powdered urea-urea condensate-sewer sludge produced in Example 1 and 85 parts by weight of thermoplastic selected from the list below was melted and mixed together. The thermoplastic plastic is selected from the group consisting of vinyl acetate, polyester, polyamide, vinyl chloride, polyethylene, polypropylene and vinyl acetate-ethylene copolymer

Example 40

Urea was mixed with a wet sewer sludge cake in sufficient amount to produce a urea-urea condensate-sewer sludge bio-fertilizer which contain a nitrogen content of 16%, then heated until the sewer sludge was dried. The fertilizer was then place around a dozen tomato, which were about 4"–5" tall, in an amount of about 50 grams. Four other similar tomato plants received no fertilizer. The plants were watered every other day using the same amount of water. After 10 days the tomato plant that was fertilized grew about 4"–5" taller than the non-fertilized plants. After the fertilized plants continued to grow at a faster rate than the non-fertilized plants and were taller, had more branches and was wider than the other plants. The fertilized plants produced more tomatoes than the unfertilized plants.

Example 41

A variety of plants which was in poor condition and were to be destroyed was collected from a nursery. The plants were watered with a 10% solution of the urea-urea condensate-sewer sludge of example 40 daily for three days. Within 10 days the plants began to grow buds and new leaves. The plants continued to grow for 3 months without any addition of fertilizer and remained in very good condition.

Example 42

The bio-fertilizer produced in example 40 was mixed with potassium phosphate to give a phosphorus oxide content of 10% then spread on a lawn with a lawn spreader. The lawn was watered daily for 3 day. The lawn began to grow rapid and turned green in color. The lawn continued to grow at about the same rate, as in the first 3 day after it was fertilized, for about three months. The ammonium salts, urea and its salts are rapid reacting fertilizer and the urea condensate and it's salts are long acting fertilizer.

Example 43

About 100 parts by weight of the urea-urea condensate-sewer sludge produced in example 40 was mixed with 50 parts by weight of aqueous formaldehyde (35% formaldehyde) the heated to 70° to 80° C. for 20 minutes. The mixture solidified to form a solid formaldehyde-urea-urea condensate-sewer sludge resin.

Example 44

Example 43 is modified wherein aqueous ammonium is added to the mixture of aqueous formaldehyde and urea-urea condensate-sewer sludge until the pH is 7.5 thereby producing an aqueous emulsion of formaldehyde-urea condensate-sewer sludge resin. Ammonium dihydrogen sulfate was added to the emulsion till the pH was 6 and the emulsion solidified.

Example 45

Example 43 was modified wherein 75 parts by weight of aqueous formaldehyde containing 35% formaldehyde is utilized.

Example 46

Example 43 is modified wherein another aldehyde was used in place of formaldehyde and selected from the list below:

| | |
|---|---|
| 1. | paraformaldehyde |
| 2. | Acetoformaldehyde |
| 3. | furfural |
| 4. | acetyl formaldehyde |
| 5. | aromatic formaldehyde |
| 5. | and mixtures of the above |

Example 47

Example 43 was modified wherein the urea-urea condensate-sewer sludge produced in example 9 is use in place of the urea-urea condensate-sewer sludge produced in example 40.

Conclusion

The addition of urea to the wet sewer sludge while it is being dried greatly reduces the odor from the drying sewer sludge by reacting the urea with the sulfur containing compounds.

The addition of urea to the wet sewer sludge increases the nitrogen content of the bio-fertilizer. The urea reacts with many of the compounds in the sewer sludge and also condensates with itself, then reacts with compounds in the sewer sludge. The enhanced bio-fertilizer may be used in the form of an aqueous solution or as granules or powder.

Aqueous or powdered nitrogen containing compound, urea-urea condensate-sewer sludge with or without carbonization auxiliaries are good flame retardant. The addition of other carbonization agents increases the development of an insulating carbon char which helps the materials to resist further degradation and thereby further exposure to flame. A plastic foam for example which contains aqueous or powdered urea-urea condensate-sewer sludge and/or it's composition, has a reduction in the melted drippings of the material being flame tested, and any burning and smoke are minimized. There is a lesser amount of smoke given off these flame retardant material when flame tested.

The aqueous urea-urea condensate-sewer sludge or it's composition are inexpensive and are very good flame retardants in fighting grass and forest fires. In fighting forest fires other useful additives may be added such as coloring material, such as ferric oxide, clay, surfactants, anti-corrosive agents, such ammonium phosphates, etc.

The urea-urea condensate-sewer sludge reacts with aldehydes to produce resins utilizing a basic or acidic catalyst.

It will be appreciated by those skilled in the Arts that changes and modifications of the preferred embodiment can be made without departing from the spirit and broader aspects of the invention as set forth in the appended Claims.

I claim:

1. The urea-urea Condensate-sewer sludge composition wherein the urea-urea-sewer sludge composition is mixed in or applied on a flammable organic material and utilized as a flame retardant composition and produced by the process consisting of mixing, heating and reacting the following components:
   A) urea and/or urea condensate, in the amount of 25 to 200 parts by weight;
   B) sewer sludge, in the amount of 100 to 200 parts by weight;
   C) carbonization auxiliaries, in the amount of 5 to 300 parts by weight;
   D) filler, in the amount of 5 to 300 parts by weight; component A and B are first heated and reacted, then component C is added and/or reacted, then component D is added and mixed.

2. The urea-urea condensate-sewer sludge composition of claim 1 wherein the urea-urea condensate-sewer sludge composition is mixed in and/or on a flammable organic material thereby producing a flame retarded composition.

3. The urea-urea condensate-sewer sludge of claim 1 is mixed in or/on a more flammable material selected from the group consisting of polyurethanes, polyester resins, unsaturated polyester resins, polyepoxy resins, polycarbonates, polyamides, polymides, polyester-polyamide resins, polyacrylonitrile, vinyl polymers and copolymers, olefin polymers and copolymers, vinyl-olefin copolymurs, polyphonylene, polysulfone, polyacetal, other plastics, natural products and mixtures thereof.

4. The urea-urea condensate-sewer sludge of claim 1 is mixed in or/on a polyurethane foam made flame retardant and is produced by the process comprising of mixing and reacting the following components:
   a) aqueous or solid urea-urea condensate-sewer sludge composition, in the amount of 25 to 100 parts by weight;
   b) polyol, in the amount of 25 to 100 parts by weight;
   c) silicone surfactant, in the amount 0.5 to 5 parts by weight;
   d) urethane catalyst, in the amount of 0.25 to 10 parts by weight;
   e) polyisocyanate, in the amount of 25 to 200 parts by weight.

5. The urea-urea condensate-sewer sludge of claim 1 mixed with an unsaturated polyester resin then cured by a peroxide catalyst thereby producing a flame retardant polyester resin.

6. The urea-urea consensate-sewer sludge composition of claim 1 is mixed with moist Portland cement and an unsaturated polyester resin which is then cured by a peroxide catalyst thereby producing a flame retardant polyester concrete.

7. The urea-urea condensate-sewer sludge composition produced by the process comprising of mixing, heating and reacting the following components:
   A) urea and/or urea condensate, in the amount of 25 to 200 parts by weight;
   B) sewer sludge, in the amoount of 100 to 200 parts by weight;
   C) carbonization auxiliaries, in the amount of 5 to 300 parts by weight;
   D) filler, in the amount 5 to 300 parts by weight; component A and B are first heated and reacted then component C is added and/or reacted then component D is added and mixed thereby producing a urea-urea condensate-sewer sludge composition which is mixed and reacted with potassium dihydrogen phosphate.

* * * * *